United States Patent [19]

Masaki et al.

[11] Patent Number: 5,330,710
[45] Date of Patent: Jul. 19, 1994

[54] NICKEL-BASE ALLOY FOR GLASS-CONTRACTING MEMBER USED IN UNENERGIZED STATE

[75] Inventors: Toshio Masaki, Hitachi; Noriaki Sasaki, Katsuta; Shin-ichiro Torata, Katsuta; Hiroshi Igarashi, Katsuta; Tetsuya Shimizu; Tomohito Iikubo, both of Nagoya, all of Japan

[73] Assignee: Doryokuro Kakunenryo Kaihatsu Jigyodan, Tokyo, Japan

[21] Appl. No.: 838,207

[22] PCT Filed: Jul. 9, 1990

[86] PCT No.: PCT/JP90/00879
§ 371 Date: Mar. 6, 1992
§ 102(e) Date: Mar. 6, 1992

[87] PCT Pub. No.: WO92/01076
PCT Pub. Date: Jan. 23, 1992

[51] Int. Cl.$^5$ ............................................. C22C 19/03
[52] U.S. Cl. .................................... 420/441; 148/410; 148/427; 148/442; 420/442; 420/443; 420/451; 420/455; 420/588
[58] Field of Search ............... 420/441, 442, 443, 451, 420/455, 588; 148/442, 427, 410

[56] References Cited

U.S. PATENT DOCUMENTS

| | | | |
|---|---|---|---|
| 2,162,252 | 6/1939 | Grossman | 420/442 |
| 3,617,263 | 11/1971 | Fontaine et al. | 420/443 |
| 4,066,448 | 1/1978 | Haeberle, Jr. | 420/446 |
| 4,088,479 | 5/1978 | Spengler | 420/443 |

FOREIGN PATENT DOCUMENTS

| | | |
|---|---|---|
| 48-79725 | 10/1973 | Japan . |
| 50-139015 | 11/1975 | Japan . |
| 51-30528 | 3/1976 | Japan . |
| 53-58920 | 5/1978 | Japan . |
| 56-62943 | 5/1981 | Japan . |
| 5662943 | 5/1981 | Japan . |
| 62-77446 | 4/1987 | Japan . |
| 62-185851 | 8/1987 | Japan . |
| 62-54390 | 11/1987 | Japan . |
| 0225535 | 1/1990 | Japan . |

Primary Examiner—Richard Dean
Assistant Examiner—Robert R. Koehler
Attorney, Agent, or Firm—Wenderoth, Lind & Ponack

[57] ABSTRACT

A nickel-base alloy for a glass-contacting member used in an unenergized state and having a composition comprising by weight 25 to 40% of chromium, 10 to 45% of cobalt, optionally 0.1 to 3.0% of titanium and optionally 0.01 to 0.05% of at least one element selected from among rare earth metals with the balance consisting of nickel and unavoidable impurities.

2 Claims, No Drawings

NICKEL-BASE ALLOY FOR GLASS-CONTRACTING MEMBER USED IN UNENERGIZED STATE

TECHNICAL FIELD

The present invention relates to a nickel-base alloy for a glass-contacting member used in an unenergized state and having an excellent resistance to corrosion by glass. Such a nickel-base alloy is utilized as the material of, e.g., containers for molten glass, agitators for molten glass, conduits for molten glass, guide pieces for molten glass, various rolls (rollers), dies for molding glass articles, spinners and glass blower (blowing pipe) used in producing various glass articles such as sheet glass, glass fiber, glass bottle, glass tableware, electrical glass, physicochemical glass, optical glass, glass for spectacles, filter glass, glass beads for traffic marking, glass for construction materials, glass for timepieces, glass for thermometers and glass for artistic handicrafts.

BACKGROUND ART

Examples of the glass-contacting member which have hitherto been used in contact with the above-described various glasses include a nickel-base alloy used as the material of a mold for hot-molding of glass and comprising 0.3 to 15% of chromium, 0.1 to 3% of titanium, 0.2 to 2.5% of beryllium and 1% or less of manganese (see Japanese Patent Laid-Open No. 30528/1976), an alloy used as the material of a mold for molding of glass and comprising 40 to 90% of nickel, 5 to 30% of cobalt, 1.5 to 6.5% of aluminum, optionally 3% or less of silicon and optionally 25% or less of copper with the balance consisting of iron (see Japanese Patent Laid-Open No. 58920/1978), a nickel-base alloy having an excellent resistance to corrosion by molten glass and comprising 0.2 to 25% of aluminum (see Japanese Patent Laid-Open No. 139015/1975), a nickel-titanium alloy suitable as a mold for molding of glass and comprising 50% of titanium and 50% of nickel (see Japanese Patent Laid-Open No. 79725/1973) and further Inconel 600 which is a nickel-base alloy represented by 15.5Cr-8Fe-Ni and Inconel 690 which is a nickel-base alloy represented by 29Cr-9Fe-Ni.

The above-described glass-contacting members used in producing the above-described glasses, such as rolls, molds and spinners, should be excellent in not only high-temperature strength and high-temperature oxidation resistance but also resistance to corrosion by glass during contact with molten glass, softened glass or solid phase glass. Conventional glass-contacting members, however, had problems such as poor high-temperature strength, poor resistance to oxidation at a high temperature, poor resistance to corrosion by glass, and low melting point. For example, Inconel 600 and Inconel 690, i.e., nickel-base alloys having the above-described compositions, had problems that they are not always excellent in the resistance to corrosion by glasses such as molten glass, softened glass and solid phase glass and had a melting point as low as about 1350° C.

The present invention has been made in view of the above-described problems accompanying the conventional members for use in contact with glass, particularly those comprising a nickel-base alloy. An object of the present invention is to provide a nickel-base alloy which is excellent in not only high-temperature strength and high-temperature oxidation resistance but also resistance to corrosion by glass such as molten glass or solidified glass, has a melting point above 1350° C., i.e., the melting point of the above-described conventional nickel-base Inconel, and is suitable as the material of a glass-contacting member used in an unenergized state.

DISCLOSURE OF THE INVENTION

The nickel-base alloy for a glass-contacting member of the present invention used in an unenergized state and having an excellent resistance to corrosion by glass is characterized by having a chemical composition comprising by weight 25 to 40% of chromium, 10 to 45% of cobalt, optionally 0.1 to 3.0% of titanium and optionally 0.01 to 0.50% of at least one element selected from among REMs (rare earth metals) with the balance consisting of nickel and unavoidable impurities.

The reason for the limitation of the chemical composition (% by weight) of the nickel-base alloy for a glass-contacting member used in an unenergized state and having an excellent resistance to corrosion by glass according to the present invention will now be described.

Chromium: 25–40%

Chromium is added for ensuring the resistance to corrosion by glass of various glass-contacting members such as rolls, molds and spinners and is limited to 25% or more for the purpose of ensuring the corrosion resistance of the above-described glass-contacting members. The upper limit of the chromium content is set to 40% or less because the addition of an excessive amount of chromium not only causes the effect to be saturated but also lowers the melting point and deteriorates the toughness of the glass-contacting member.

Cobalt: 10–45%

Cobalt is an element useful for improving the productivity of various glass articles through a rise of the melting point of the glass-contacting member and, at the same time, improving the resistance to corrosion by glass when this member is in contact with molten glass or solidified glass. The cobalt content is limited to 10% or more for the purpose of raising the melting point and improving the corrosion resistance. The upper limit of the cobalt content is set to 45% or less because the addition of an excessive amount of cobalt not only causes the effect to be staurated but also deteriorates the toughness of the glass-contacting member.

Titanium: 0.1–3.0%

Titanium is an element useful for improving the resistance to corrosion by glass when the glass-contacting member is in contact with molten glass or solidified glass and, at the same time, improving the releasability of scale and may optionally be added in an amount of 0.1% or more for attaining the effect of improving the above-described corrosion resistance and releasability of scale. The addition of an excessive amount of titanium, however, not only causes the effect to be saturated but also unfavorably lowers the melting point of the glass-contacting member and the productivity of various glass articles. Therefore, the titanium content should be 3.0% or less.

At Least One Element Selected From Among REMs: 0.01–0.50%

REM is an element useful for improving the resistance to corrosion by glass when the glass-contacting member is in contact with molten glass or solidified glass and may optionally be added in an amount of 0.01% or more for the purpose of attaining such an effect. The addition of an excessive amount of REM, however, not only causes the effect to be saturated but also unfavorably deteriorates the toughness of the glass-contacting member. Therefore, when REM is added, the content should be 0.50% or less.

Nickel: the Balance

Nickel is effective in ensuring the resistance to corrosion by glass when the glass-contacting member is in contact with molten glass or solidified glass and, at the same time, improving the productivity of various glass articles by virtue of its high melting point. Therefore, nickel is used as the balance.

The glass-contacting member of the present invention used in an unenergized state has the above-described chemical composition and comprises nickel having a high melting point and an excellent corrosion resistance as a matrix, and a suitable amount of chromium added for the purpose of ensuring the resistance to corrosion by glass, a suitable amount of cobalt added for the purpose of improving the melting point and the resistance to corrosion by glass, a suitable amount of titanium optionally added for the purpose of further improving the corrosion resistance and, at the same time, improving the releasability of scale, and a suitable amount of at least one REM optionally added for allowing voids to stay inside the alloy to further improve the corrosion resistance. By virtue of this constitution, the glass-contacting member of the present invention is excellent in not only high-temperature strength and high-temperature oxidation resistance but also resistance to corrosion by molten glass and solidified glass, and the high melting point thereof serves to improve the productivity of various glass articles.

BEST MODE FOR CARRYING OUT THE INVENTION

Various nickel-base alloys comprising chemical ingredients listed in Table 1 were molten by vacuum arc melting to prepare ingots each having a weight of 30 kg. In Table 1, Mm represents mischemetal (La+Ce) among REMs and Inconel 690 was used in Comparative Example 1.

Subsequently, each ingot was hot-forged to make a round bar having a diameter of 20 mm and subjected to the following various tests.

At the outset, the high-temperature oxidation resistance was evaluated by determining an increase in the weight by oxidation after maintaining the ingot at 1250° C. for 96 hr in the atmosphere within a Siliconit tubular furnace.

The resistance to corrosion by glass was evaluated by determining the extent of corrosion after immersing the ingot in a molten borosilicate glass at 1250° C. for 50 hr.

The high-temperature strength was evaluated by determining the tensile strength at 1000° C. by a tensile test according to JIS G 0567.

The melting point was evaluated by measuring the solidus temperature with a differential thermal analyzer.

The results are also given in Table 1.

TABLE 1

| Division | No. | Chemical ingredients (wt. %) | | | | | 1250° C./96 hr Increase in weight by oxidation (g/m$^2$) | 1250° C./50 hr Extent of corrosion (mm) | 1000° C. Tensile strength (kgf/mm$^2$) | Solidus (°C.) |
|---|---|---|---|---|---|---|---|---|---|---|
| | | Cr | Co | Ti | REM | Ni | | | | |
| Example | 1 | 33.5 | 10.2 | — | — | the balance | 1.76 | 0.059 | 10.0 | 1393 |
| | 2 | 33.6 | 18.0 | — | — | the balance | 1.71 | 0.093 | 10.2 | 1401 |
| | 3 | 32.2 | 31.3 | — | — | the balance | 1.67 | 0.074 | 11.3 | 1408 |
| | 4 | 27.5 | 15.6 | — | — | the balance | 1.73 | 0.097 | 12.6 | 1414 |
| | 5 | 25.8 | 30.9 | — | — | the balance | 1.75 | 0.084 | 12.2 | 1433 |
| | 6 | 37.1 | 31.5 | 2.8 | — | the balance | 1.69 | 0.077 | 12.6 | 1399 |
| | 7 | 26.5 | 44.7 | — | — | the balance | 1.72 | 0.096 | 12.8 | 1436 |
| | 8 | 37.1 | 44.2 | — | — | the balance | 1.64 | 0.100 | 13.4 | 1413 |
| | 9 | 32.2 | 41.8 | 2.1 | — | the balance | 1.56 | 0.032 | 11.6 | 1417 |
| | 10 | 32.2 | 31.3 | 0.3 | — | the balance | 1.60 | 0.054 | 10.3 | 1402 |
| | 11 | 31.5 | 30.8 | 1.3 | Y: 0.09 | the balance | 1.40 | 0.071 | 10.0 | 1381 |
| | 12 | 33.1 | 30.9 | — | Y: 0.34 | the balance | 1.33 | 0.032 | 10.9 | 1380 |
| | 13 | 30.9 | 34.2 | 0.2 | Mm: 0.15 | the balance | 1.35 | 0.055 | 11.2 | 1387 |
| | 14 | 29.1 | 28.2 | 1.6 | Mm: 0.03 | the balance | 1.44 | 0.082 | 11.5 | 1362 |
| Comp. Example | 1 | 28.6 | Fe: 9.0 | 0.32 | Al: 0.28 | the balance | 2.04 | 0.142 | 7.7 | 1341 |
| | 2 | 33.6 | <0.01 | — | — | the balance | 2.11 | 0.123 | 7.1 | 1378 |
| | 3 | 32.2 | 52.2 | — | — | the balance | 1.93 | 0.131 | 12.1 | 1414 |
| | 4 | 42.0 | <0.01 | — | — | the balance | 2.00 | 0.128 | 5.2 | 1356 |
| | 5 | 42.0 | 15.9 | — | — | the balance | 1.80 | 0.135 | 8.4 | 1363 |
| | 6 | 20.2 | 40.3 | — | — | the balance | 2.13 | 0.179 | 9.1 | 1430 |

As is apparent from the results given in Table 1, all the nickel-base alloys for a glass-contacting member of Examples 1 to 14 according to the present invention exhibited a lower increase in weight by oxidation at 1250° C. and therefore apparently had a superior high-temperature strength. Further, all of them exhibited a lower extent of corrosion in a molten borosilicate glass at 1250° C. and therefore were found to have a superior resistance to corrosion by glass when brought into contact with glass. Further, they had a high tensile strength value at 1000° C. and therefore apparently had a superior high-temperature strength. Further, they had a melting point above that of Inconel 690 (Comparative Example 1), i.e., the conventional nickel-base alloy, and it has been confirmed from this fact that they can improve the productivity of glass articles.

By contrast, the nickel-base alloys of Comparative Examples 1 to 6 exhibited a larger increase in weight by oxidation in the atmosphere and a larger extent of corrosion in a molten glass. This brings about a problem of durability when they are used as the material of a glass-contacting member. Further, some of them had a considerably low tensile strength and a low melting point.

The nickel-base alloy for a glass-contacting member used in an unenergized state according to the present invention has a composition comprising by weight 25 to 40% of chromium, 10 to 45% of cobalt, optionally 0.1 to 3.0% of titanium and optionally 0.01 to 0.50% of at least one element selected from among REMs with the balance consisting of nickel and unavoidable impurities and, by virture of this constitution, is excellent in not only high-temperature strength and high-temperature oxidation resistance but also resistance to corrosion by molten glass or solidified glass, has a melting point above that of Inconel 690, i.e., the conventional nickel-base alloy. Thus, the nickel-base alloy of the present invention brings about such a remarkably excellent effect that it exhibits an excellent durability when used as the material of rolls, sprnners, molds, etc., utilized in producing glass articles, particularly at a high temperature and further improves the productivity of glass articles.

We claim:

1. A nickel-base alloy for a glass-contacting member used in an unenergized state and having an excellent resistance to corrosion by glass, said alloy consisting essentially in percent by weight of 25 to 40% of chromium, 10 to 45% of cobalt and 0.01 to 0.50% of at least one element selected from among rare earth metals with the balance consisting of nickel and unavoidable impurities.

2. A nickel-base alloy for a glass-contacting member used in an unenergized state and having an excellent resistance to corrosion by glass, said alloy consisting essentially in percent by weight of 25 to 40% of chromium, 10 to 45% of cobalt and 0.1 to 3.0% of titanium and 0.01 to 0.50% of at least one element selected from among rare earth metals with the balance consisting of nickel and unavoidable impurities.

* * * * *